United States Patent [19]
Bennet

[11] Patent Number: 6,023,664
[45] Date of Patent: Feb. 8, 2000

[54] VEHICLE CRASH SENSING SYSTEM

[75] Inventor: Jeffrey S. Bennet, Brownstown, Mich.

[73] Assignee: Automotive Systems Laboratory, Inc., Farmington Hills, Mich.

[21] Appl. No.: 08/950,639

[22] Filed: Oct. 15, 1997

Related U.S. Application Data

[60] Provisional application No. 60/029,126, Oct. 16, 1996.

[51] Int. Cl.[7] .................................................. G01P 15/00
[52] U.S. Cl. .............................. 702/141; 73/488; 701/45; 701/70
[58] Field of Search ............................... 702/141; 701/45, 701/47, 70; 340/467, 669; 324/162; 180/282; 73/488, 514.91

[56] References Cited

U.S. PATENT DOCUMENTS

| | | | |
|---|---|---|---|
| 4,836,024 | 6/1989 | Woehrl et al. | 73/514 |
| 4,839,838 | 6/1989 | LaBiche et al. | 364/709.11 |
| 4,914,598 | 4/1990 | Krogmann et al. | 364/434 |
| 4,950,914 | 8/1990 | Kurihara et al. | 307/10.1 |
| 4,950,915 | 8/1990 | Spies et al. | 307/10.1 |
| 5,067,745 | 11/1991 | Yoshikawa | 280/735 |
| 5,083,276 | 1/1992 | Okano et al. | 364/424.05 |
| 5,173,614 | 12/1992 | Woehrl et al. | 307/10.1 |
| 5,182,459 | 1/1993 | Okano et al. | 307/10.1 |
| 5,202,831 | 4/1993 | Blackburn et al. | 364/424.05 |
| 5,234,228 | 8/1993 | Morota et al. | 280/734 |
| 5,261,694 | 11/1993 | White et al. | 280/735 |
| 5,297,052 | 3/1994 | McIntyre et al. | 364/453 |
| 5,363,303 | 11/1994 | Kaneko et al. | 364/424.05 |
| 5,365,114 | 11/1994 | Tsurushima et al. | 307/10.1 |
| 5,375,468 | 12/1994 | Ohta et al. | 73/517 AV |
| 5,377,523 | 1/1995 | Ohta et al. | 73/1 D |
| 5,387,819 | 2/1995 | Ueno et al. | 307/10.1 |
| 5,389,822 | 2/1995 | Hora et al. | 307/10.1 |
| 5,396,424 | 3/1995 | Moriyama et al. | 364/424.05 |
| 5,416,360 | 5/1995 | Huber et al. | 307/10.1 |
| 5,428,340 | 6/1995 | Kawabata et al. | 340/438 |
| 5,433,101 | 7/1995 | Spangler et al. | 73/1 D |
| 5,440,913 | 8/1995 | Crispin et al. | 73/1 D |
| 5,446,661 | 8/1995 | Gioutsos et al. | 364/424.05 |
| 5,495,414 | 2/1996 | Spangler et al. | 364/424.05 |
| 5,506,454 | 4/1996 | Hanzawa et al. | 307/10.1 |
| 5,538,099 | 7/1996 | Blackburn et al. | 180/282 |
| 5,547,149 | 8/1996 | Kalberer et al. | 244/121 |
| 5,587,906 | 12/1996 | McIver et al. | 364/424.045 |
| 5,609,358 | 3/1997 | Iyoda et al. | 280/735 |
| 5,610,575 | 3/1997 | Gioutsos | 340/429 |
| 5,620,203 | 4/1997 | Jeenicke et al. | 280/735 |
| 5,668,319 | 9/1997 | Garabedian | 73/514.09 |
| 5,809,439 | 9/1998 | Damisch | 701/45 |
| 5,815,393 | 9/1998 | Chae | 364/424.056 |
| 5,845,730 | 12/1998 | Thuen et al. | 180/282 |

*Primary Examiner*—Patrick Assouad
*Attorney, Agent, or Firm*—Lyon, P.C.

[57] ABSTRACT

A vehicle crash sensing system for making omnidirectional acceleration measurements comprises 1) an assembly (26) of at least three preferably self-testable accelerometers (10, 12, 14) mounted in an array on a substantially common plane (16) with axes (18, 20, 22) both skewed relative to one another and intersecting a region near a point, and 2) an electronic control module (30). The accelerometer signals (A, B, C) provide a redundant measure of the associated acceleration vector (R). The magnitudes of components for associated acceleration basis vectors are calculated from the accelerometer signals (A, B, C) and used in the detection of crashes for associated safety restraint systems (801, 802, 803, 804). Algorithms (500, 600, 700) in the electronic control module remove accelerometer offset, determine if the acceleration measurements are self-consistent whereby the measurement of acceleration from one accelerometer is consistent with a corresponding estimate thereof based upon measurements of acceleration from the other accelerometers, control self-testing, detect crashes using only self-consistent acceleration measurements, and activate associated safety restraint systems (801, 802, 803, 804) as appropriate.

20 Claims, 9 Drawing Sheets

VEHICLE CRASH SENSING SYSTEM

CROSS-REFERENCE TO RELATED APPLICATIONS

This application claims the benefit of prior U.S. Provisional application Ser. No. 60/029,126 filed Oct. 16, 1996 now abandoned.

TECHNICAL ART

The instant invention generally relates to systems and methods for vehicle crash sensing and more particularly to improved systems and methods for omnidirectional crash sensing with a plurality of accelerometers in a vehicle safety system.

BACKGROUND OF THE INVENTION

A vehicle may contain safety restraint actuators which are activated in response to a vehicle crash for purposes of mitigating occupant injury. Examples of such restraint actuators include air bags, seat belt pretensioners, and deployable knee bolsters. These vehicle crashes may occur over a wide range of directions relative to the longitudinal axis of the vehicle, and the effectiveness of some restraint actuators can be directionally dependent. A particular air bag restraint system may provide the best occupant protection for collisions in one particular direction along the restraint system axis, and diminishing levels of protection as collision angles depart from the preferred direction. For example, a frontal air bag system provides the best protection for collisions which are directed along the longitudinal axis of the vehicle, while also providing protection but perhaps at a lesser degree for angular or offset crashes, with collision angle measured relative to the longitudinal axis of the vehicle. For collision angles less than 45 degrees in magnitude, the crash is primarily front directed, while for collision angles between 45 and 135 degrees in magnitude, the crash is primarily side directed, while for crashes between 135 and 180 degrees in magnitude, the crash is primarily rear directed.

Both frontal and side-impact air bag systems are well known in the art, and each system is preferably only activated for collisions within its respective range of collision angles. For example, a frontal air bag system might preferably not be activated during a side impact, and a side-impact air bag system might preferably not be activated during a frontal impact. Each such system would have an associated range of angles for which the system is preferentially deployed in the event of a crash for which the occupant might otherwise be injured.

The particular safety restraint actuator(s) which are preferably activated for a given range of crashes is referred to herein as a safety restraint system, whereby a given vehicle may contain a plurality of such safety restraint systems. For each safety restraint system in a given vehicle there is an associated set of crashes of various severity levels which are so directed as to require the activation of the safety restraint system in order to mitigate occupant injury. For the remaining crashes, the restraint system is preferentially not activated so as to minimize the risk of restraint induced injury to the occupant or to avoid unnecessary repair costs associated with the activation of the restraint system.

A safety restraint system is activated by a crash discrimination system which senses the acceleration associated with the crash and determines from the acceleration-time waveform if and when to send an activation signal to the safety restraint system. For an air bag system, this activation signal generally comprises a current of sufficient magnitude and duration to initiate an ignitor which in turn ignites the gas generant composition in an inflator to generate the gases necessary to fill the air bag. The crash discrimination system generally has a restraint sensing axis aligned with the associated restraint system axis. For example, for a frontal air bag system, the restraint system axis and the restraint sensing axis are both aligned with the longitudinal axis of the vehicle, whereas for a side-impact air bag system, the both the restraint system axis and the restraint sensing axis are perpendicular to the longitudinal axis of the vehicle. Generally, acceleration components directed along the restraint sensing axis determine the activation of the associated restraint system, although off-axis components of acceleration can sometimes be interpreted as axial components, especially if the sensor associated with the crash discrimination system is rotated in the course of the crash because of structural deformation of the vehicle.

A crash discrimination system must discriminate between crash conditions requiring restraint system activation—"ON" conditions,—and crash conditions for which the restraint system is preferentially not activated—"OFF" conditions. The borderline between these two conditions is referred as a threshold condition. Those crash conditions near the threshold for which the restraint system is preferentially not activated are referred as "threshold-OFF" conditions (e.g. 8 MPH), while those crash conditions near the threshold for which the restraint system is preferentially activated are referred as "threshold-ON" conditions.

One set of known crash discrimination systems utilizes a plurality of mechanical discrimination sensors positioned and mounted in various locations within the vehicle crush zone or the engine compartment. Each mechanical discrimination sensor generally has a characteristic damping level, which when increased, or over damped, causes the sensor to behave more like a delta-velocity switch; which when decreased, or under damped, causes the sensor to behave more like an acceleration switch. In order to prevent borderline crashes, i.e. "threshold-OFF" conditions, from activating the safety restraint system, mechanical discrimination sensors are generally overdamped, having a delta-velocity threshold in the range of 10–12 MPH, so as to prevent "threshold-OFF" conditions from activating the safety restraint system but with the associated disadvantage that the corresponding "threshold-ON" performance is variable. Generally mechanical discrimination sensors operate by closing a mechanical switch in response to an acceleration signal.

In operation, any one of the plurality of mechanical discrimination sensors can activate the associated safety restraint system. Also, a safing sensor is generally placed in series with the safety restraint system to improve the noise immunity of the system, whereby to activate the safety restraint system, both any one of the mechanical discriminating sensors must be ON, and the safing sensor must be ON, where ON refers to the condition where the sensing characteristic of the sensor has exceeded its associated threshold level. In other words, the activation of the safety restraint system is given by the logical AND combination of the safing sensor with the logical OR combination of the plurality of mechanical discrimination sensors. Safing sensors typically are simply mechanical acceleration switches with a relatively low switching threshold (e.g. 1–2 G's) which is not suitable for crash discrimination because occupants could be harmed by the deployment of an air bag restraint system which might not otherwise be needed to mitigate occupant injury.

Another known crash discrimination system utilizes a single point discriminating crash sensor comprising an electronic control module incorporating an accelerometer, whereby the electronic control module processes the acceleration waveform measured by the accelerometer and outputs a signal to activate the safety restraint system if selected properties of the acceleration waveform according to a sensing characteristic exceed a specific switching threshold. The sensing characteristic is typically implemented by an algorithm executed by a microprocessor in the electronic control module. This activation signal may take a variety of forms, including but not limited to a voltage level, a current level, or a switch closure. The single point discriminating crash sensor is generally mounted at a location within the vehicle from which an acceleration signal is observable for each crash within the set of crashes for which the associated restraint system should be activated. Examples of single point crash discrimination systems are found in U.S. Pat. Nos. 5,067,745, 5,365,114, 5,396,424, 5,495,414 and 5,587,906.

The prior art teaches accelerometer based crash sensors which are self-testable. U.S. Pat. Nos. 5,387,819, 5,506,454, 5,433,101 and 5,495,414 teach the use accelerometers which sense the capacitance of a moveable electrode, whereby the sensing elements may be self-tested with electrostatic deflection. U.S. Pat. Nos. 4,950,914 and 5,428,340 teach the use of piezoelectric sensing elements which are tested by use of a counter piezoelectric effect. U.S. Pat. Nos. 5,375,468 and 5,377,523 teach the use of a piezoelectric accelerometer coupled to a vibrator. U.S. Pat. No. 4,950,915 teaches the use of a piezoelectric sensing element which is tested with acoustic energy. U.S. Pat. No. 5,440,913 teaches the use of dual accelerometers which are continuously tested under normal driving conditions.

The prior art teaches the used of plural redundant accelerometers on a common axis for improved reliability, wherein both accelerometer signals are processed and compared, and if the separate signals from the individual accelerometers are not equal within a certain tolerance the signals are rejected. This known redundant scheme only works along one axis of acceleration. U.S. Pat. Nos. 5,182,459 and 5,363,303 teaches the use of dual piezoelectric accelerometers which are each testable. U.S. Pat. Nos. 5,389,822 and 5,083,276 teach the AND combination of two acceleration sensors installed at approximately the same location. Plural redundant accelerometers sense acceleration along only a single axis. Therefore in systems requiring omnidirectional acceleration sensing and thereby incorporating plural sensing axes, this safing arrangement requires 2 accelerometers for each sensing axis.

A single point discriminating crash sensor may incorporate a safing sensor for improved reliability and protection against erroneous acceleration measurements. An electromechanical switch or safing sensor is physically aligned with the axis of the accelerometer and closes once a certain deceleration threshold is reached. An algorithm processes the vehicle acceleration measurement. The algorithm processor in turn controls a silicon switch which is configured in an AND relationship with the electromechanical switch. Therefore, the electromechanical switch closure must agree in time with the acceleration signal controlled closure in order for the AND requirement to be met. The electromechanical scheme only works along one axis of acceleration. U.S. Pat. No. 5,261,694 teaches that the safing sensor can be reconfigured as a crash discriminating sensor in the event that the single point discriminating crash sensor otherwise fails, whereby this reconfigurable safing sensor is co-located in a common housing with the accelerometer based discriminating crash sensor. U.S. Pat. No. 5,416,360 teaches the combination of a mechanical crash sensor with an electronic crash sensor for improved reliability.

The disadvantage of electromechanical safing sensors for protecting against erroneous acceleration measurements are as follows:

a) Since multiple switches in known systems are configured in an "AND" fashion, both switches must be calibrated to close at the same time over the vehicle life under all environmental conditions.

b) Electromechanical sensors are large and costly.

c) Electromechanical switches can be rendered non-functional if the switches do not close in correct order.

d) Electromechanical sensors have undetectable failure modes which may result in failure to switch timely or failure to switch at all.

e) Electromechanical switch sensors only work on one axis of acceleration. Therefore, if multiple axes of acceleration are required to be "sated", this system requires a separate sensor for every direction of acceleration measurement.

The prior art teaches the control of activation of an air bag system on the basis of collision direction. U.S. Pat. No. 5,609,358 discloses a system incorporating a combination of mechanical crash sensor and accelerometer based crash sensor for detecting collision direction and magnitude upon which decisions are made to either deploy or inhibit deployment of associated plural air bag systems. U.S. Pat. Nos. 4,836,024 and 5,173,614 teach a pair of accelerometers which are angularly displaced left and right of the vehicle longitudinal axis to improve the response characteristic and to determine the impact direction. U.S. Pat. Nos. 5,202,831, 5,234,228 and 5,620,203 teach a combination of longitudinal and lateral crash sensors for detecting crash direction. However, since the axes of the separate accelerometers are skewed with respect to one another, these prior art systems do not provide the redundancy necessary for validation of the separate signals.

The prior art teaches the measurement of acceleration with a plurality of greater than two accelerometers which are skewed relative to one another. U.S. Pat. No. 5,547,149 discloses a system of three strings of accelerometers incorporated in an aircraft safety restraint system. Each string of accelerometers is skewed relative to one another and comprises a plurality of acceleration activated sensors for improved reliability. However, there is no teaching of the utilization of accelerometers from distinct accelerometer strings for purposes of either determining the basis components of the associated acceleration vector, or for improving reliability by testing for self-consistency of acceleration measurements from separate directions.

The prior art teaches redundant accelerometer and gyro elements in strap down navigation units for improved reliability and fault tolerance. In U.S. Pat. No. 4,914,598 a plurality of at least four gyro units and at least four accelerometers skewed relative to one another and arranged with respective axes extending radially with respect to a common reference axis an located on a notional cone the axis of which coincides with the common reference axis. In U.S. Pat. No. 5,297,052 a similar plurality of gyro units and accelerometers is arranged with axes aligned with perpendiculars to six of twelve faces of a regular dodecahedron. Faulty gyro units and accelerometers are identified from parity relationships and using voting circuits. Redundant processors further improve reliability.

SUMMARY OF THE INVENTION

The instant invention overcomes the above-noted problems by providing an array of at least three accelerometers for omnidirectional acceleration sensing and safing, within a plane, from a single central mounting location. The resulting three acceleration signals in combination validate one another and therefore eliminate undetectable failure modes of prior art systems. The array of three accelerometers can be packaged relatively compactly and inexpensively on a single integrated circuit platform. The system of the instant invention can be mounted in various orientations, and in a preferred embodiment having a symmetrical arrangement of the accelerometers the associated electronic control module containing the instant invention can be rotated in 90 degree increments subject to only simple recalibration procedures.

An omnidirectional accelerometer measures the acceleration vector in a plane and is useful in controlling safety restraint systems which have a plurality of restraint axes, such as in the combination of a frontal air bag system and a side air bag system. An arbitrary acceleration vector in a plane can be described by the magnitudes of two associated basis vectors, for example the longitudinal (Y) and lateral (X) components of acceleration in a Cartesian plane. Accordingly this acceleration vector has two degrees of freedom whereby a minimum of two differently directed acceleration measurements are necessary to define the vector. While only two such measurement components are sufficient to define the acceleration vector, more than two such measurement components provide redundancy which can be used to detect and ignore erroneous acceleration measurements.

Accordingly, one object of the instant invention is to provide an improved crash sensing system which is omnidirectional.

A further object of the instant invention is to provide an improved crash sensing system which is reliable.

A yet further object of the instant invention is to provide an improved crash sensing system which is relatively immune to false activation from electromagnetic interference.

A yet further object of the instant invention is to provide an improved crash sensing system which can provide a vector acceleration measurement even if a single sensor fails.

A yet further object of the instant invention is to provide an improved crash sensing system which is fault tolerant.

In accordance with these objectives, one feature of the instant invention is the incorporation of three generally coplanar accelerometers having corresponding sensing axes oriented in different directions.

Another feature of the instant invention is the incorporation of three generally coplanar accelerometers having corresponding sensing axes which generally intersect a region near a common point.

Yet another feature of the instant invention is the incorporation of a means for calculating the expected acceleration of the third accelerometer from the acceleration measurements of the first two accelerometers, and for then comparing this expected acceleration measurement with the actual measurement from the third accelerometer to determine the validity of the corresponding acceleration measurement.

Yet another feature of the instant invention is the incorporation of a means for calculating the components of a set of basis vectors from each unique pair of accelerometers, and then comparing the associated sets of basis vector components to determine the validity of the corresponding acceleration measurement.

Yet another feature of the instant invention is the incorporation of a means for inhibiting the deployment of a safety restraint system if the corresponding acceleration measurement is invalid.

The specific features of the instant invention provide a number of associated advantages. One advantage of the instant invention with respect to the prior art is that the instant invention provides a redundant measure of vector acceleration with a minimum number of accelerometers.

Another advantage of the instant invention is that the redundancy from using three independent acceleration measurements to measure a two degree of freedom acceleration vector improves system reliability.

Another advantage of the instant invention is that the redundancy from using three independent acceleration measurements to measure a two degree of freedom acceleration vector improves immunity to false activations from electromagnetic interference.

Yet another advantage of the instant invention is that given the redundancy from using three independent acceleration measurements to measure a two degree of freedom acceleration vector, if a single accelerometer fails, a vector acceleration measurement can be made from the remaining two accelerometers.

Yet another advantage of the instant invention is that given the redundancy from using three independent acceleration measurements to measure a two degree of freedom acceleration vector, if a single accelerometer fails, the crash sensing system can still function, albeit with reduced reliability.

Accordingly, the instant invention provides an omnidirectional acceleration sensing system having redundancy by virtue of the relative orientations of the constituent accelerometers, whereby the redundancy effectively provides a safing function for the system. The instant invention provides from a single central location both longitudinal and lateral validated acceleration signals.

The instant invention will be more fully understood after reading the following detailed description of the preferred embodiment with reference to the accompanying drawings. While this description will illustrate the application of the instant invention in crash sensing systems, it will be understood by one with ordinary skill in the art that the instant invention can also be applied to any systems which utilize measurements of acceleration vectors in a plane.

BRIEF DESCRIPTION OF THE DRAWINGS

FIG. 1 illustrates an omnidirectional sensing system in accordance with the instant invention.

FIGS. 2 2A 2B and 2C are illustrate the signals associated with the accelerometers depicted in FIG. 1.

DETAILED DESCRIPTION OF THE PREFERRED EMBODIMENT(S)

Figures 1, 2A:
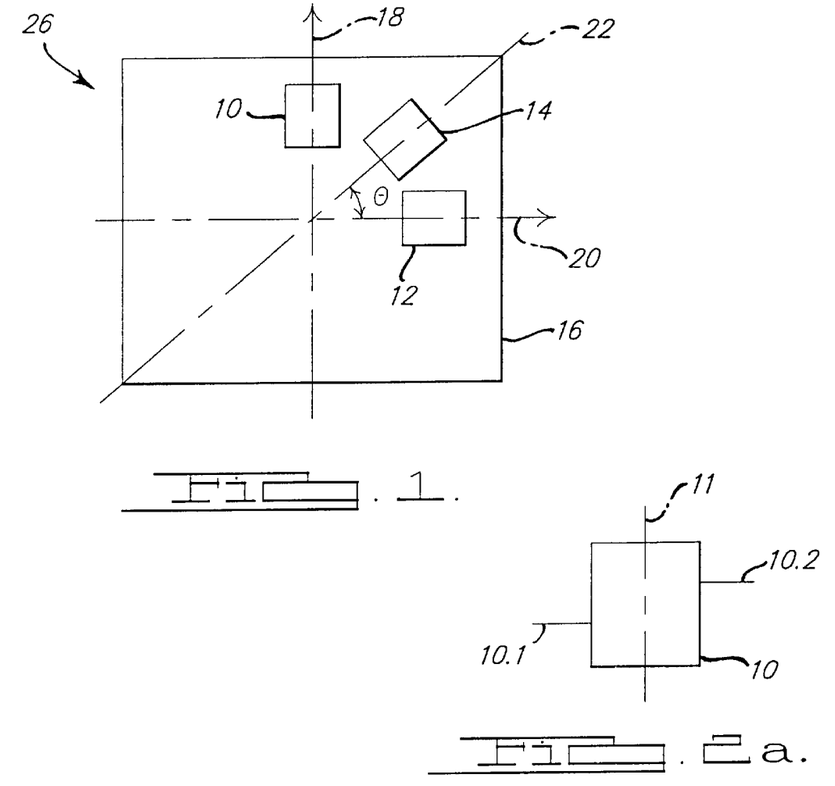

Referring to FIG. 1, an accelerometer assembly 26 comprises three accelerometers 10, 12 and 14 mounted in an array on a substantially common plane, as for example, on a platform 16. Accelerometer 10 is orientated parallel to the longitudinal axis 18 of the vehicle and is sensitive to front and rear impacts, including offset crashes, and to angular crashes. Accelerometer 12 is oriented parallel to the lateral axis 20 of the vehicle and is sensitive to side impacts or angular impacts. Accelerometer 14 is oriented along an axis 22 which is intermediate to the longitudinal 18 and lateral 20 axes of the vehicle, and preferably at an angle $\theta$ of 45 degrees relative to each the axes 18 and 20. Accelerometer 14 could also be positioned at 90 degree increments from the 45 degree location shown in FIG. 1 because of the associated symmetries of the system. The axes of accelerometers 10, 12, and 14 preferably share a common point of intersection. Accelerometer 14 provides a redundant measurement, which is used to validate the measurements from accelerometers 10 and 12. The accelerometer assembly 26 is further mounted in a electronic control module 30 which is preferably centrally located within the vehicle 24 as shown in FIG. 12. Each of accelerometers 10, 12, and 14 preferably provide bipolar acceleration measurements with a symmetrical, zero centered range, for example +/-40 G's. Depending upon the vehicle crush characteristics, the accelerometer range is generally between +/-30 G's and +/-250 G's. Furthermore, each of accelerometers 10, 12, and 14 are preferably both electrically and mechanically testable.

Figure 2B:
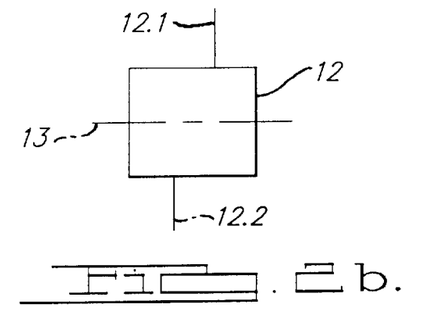
Figure 2C:
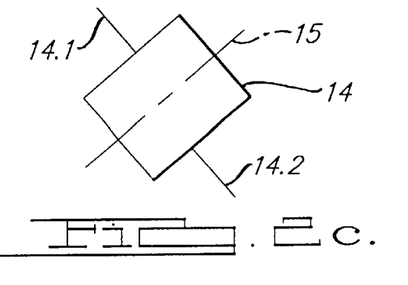

Referring to FIG. 2, accelerometers 10, 12, and 14 have associated sensing axes 11, 13, and 15 respectively, which in FIG. 1 are shown aligned with associated axes 18, 20, and 22 respectively. Moreover, the transduced acceleration measurements from each accelerometer 10, 12, and 14 is output as polarized signals 10.1, 12.1, and 14.1 respectively. In a preferred system, accelerometers 10, 12, and 14 also incorporate a means for testing their operability, for example using signals 10.2, 12.2, or 14.2 to cause the proof masses of the respective accelerometers to be electrostatically deflected, thereby causing the output of an associated acceleration signal 10.1, 12.1, or 14.1.

Figure 3:
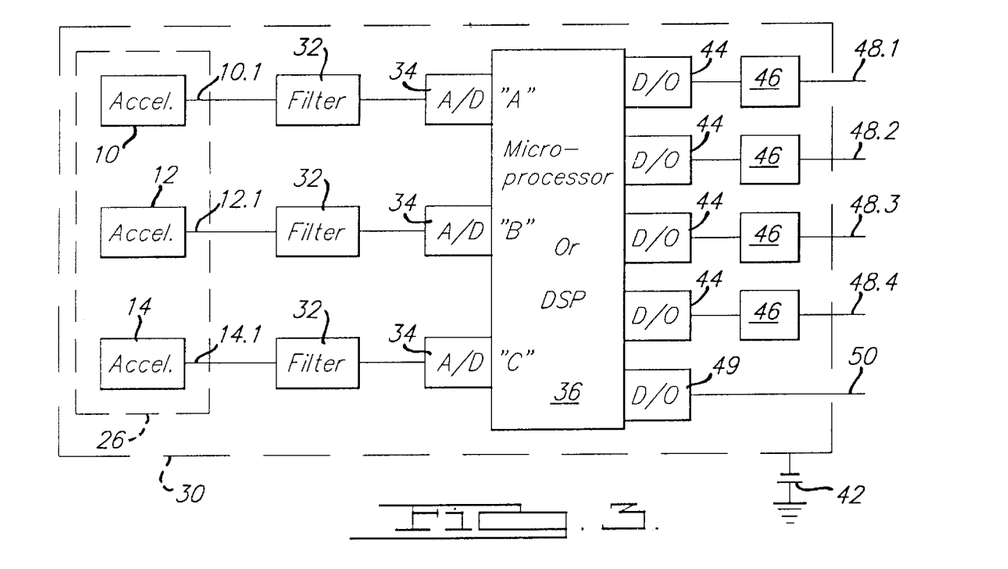
FIG. 3 illustrates one embodiment of a system incorporating the instant invention.
Figure 8:
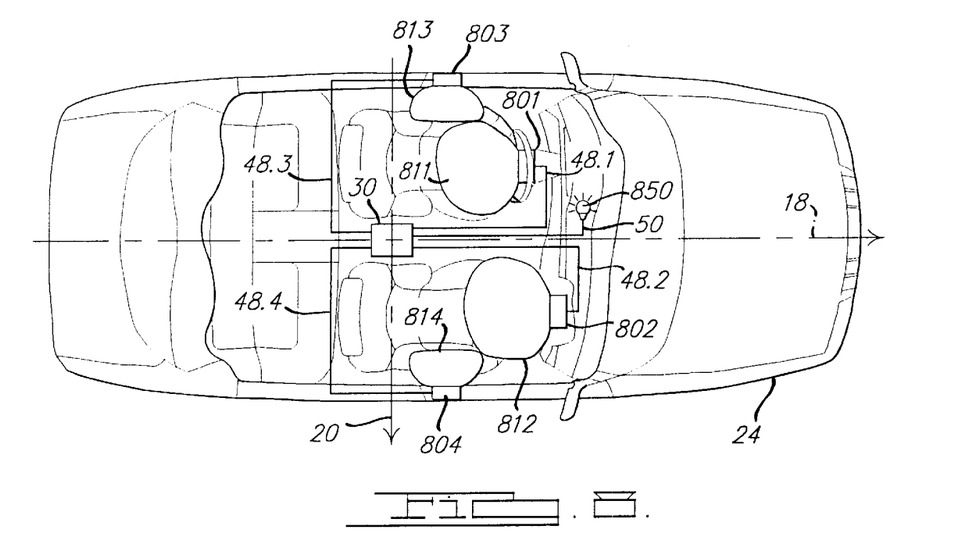
FIG. 8 illustrates an environment of the instant invention.

Referring to FIGS. 3 and 8, the accelerometer assembly 26 is incorporated in a electronic control module 30 which processes the acceleration signals 10.1, 12.1, and 14.1 to determine if a vehicle crash of sufficient severity has occurred to warrant the deployment of one or more associated safety restraint systems 801, 802, 803, or 804. FIG. 8 illustrates both driver and passenger frontal air bag safety restraint systems 801 and 802 respectively with respective air bags 811 and 812 deployed. FIG. 8 further illustrates both driver and passenger side air bag safety restraint systems 803 and 804 with respective air bags 813 and 814 deployed. Referring to FIG. 3, each accelerometer signal 10.1, 12.1, and 14.1 respectively is passed through an anti-aliasing filter 32, which is preferably a Bessel filter—which has desirable linear phase properties—having a cutoff frequency of about 400 Hz. The filtered acceleration signals are then sampled by respective analog-to-digital ("A/D") converters 34 and read by the associated microprocessor/DSP 36 as signals "A", "B", and "C" corresponding to the outputs from accelerometers 10, 12, and 14 respectively. The microprocessor/DSP 36 processes the signals in accordance with an algorithm described hereinbelow, and in accordance with crash sensing algorithms associated with each of the respective safety restraint systems 801, 802, 803, or 804, wherein if the crash severity associated with a respective safety restraint system 801, 802, 803, or 804 is sufficiently great, an associated activation signal is generated by a digital output 44 which in turn activates an associated firing circuit 46 generating an associated firing signal 48.1, 48.2, 48.3 or 48.4 which activates the associated safety restraint system 801, 802, 803, or 804. Furthermore, should the microprocessor/DSP 36 detect an accelerometer fault or other error, then digital output 49 generates a warning signal 50 which activates a warning device 850—such as for example a light, a buzzer, a tone generator, or a voice generator—in the vehicle so as to warn the occupants of the vehicle that a malfunction has occurred. It will be recognized by one of ordinary skill in the art that the function of a digital output, 44 or 49, can also be performed by a digital-to-analog converter. The components of the electronic control module 30 are powered by a source of power 42 such as the vehicle battery.

Figure 4:
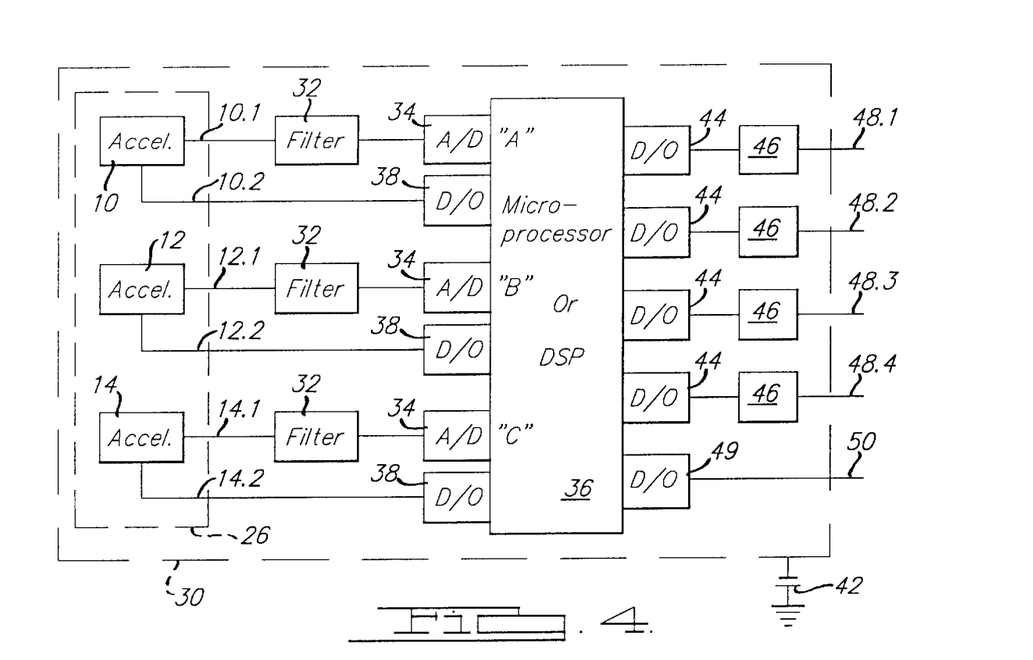
FIG. 4 illustrates another embodiment of a system incorporating the instant invention.

Referring to FIG. 4, the control module in a preferred embodiment of the instant invention incorporates a means for testing the individual accelerometers 10, 12, and 14, whereby for each respective accelerometer 10, 12, or 14, the microprocessor/DSP generates a respective test signal 10.2, 12.2, or 14.2 on an output port 38, either as a digital output or via a digital-to-analog converter which causes the proof mass of the accelerometer 10, 12, or 14 to be deflected, as if by an acceleration, thereby causing a respective output signal 10.1, 12.1, or 14.1 which is filtered by an anti-alias filter 32 and measured by the microprocessor/DSP 36 as for acceleration signals caused by kinematic accelerations.

Figure 5A:
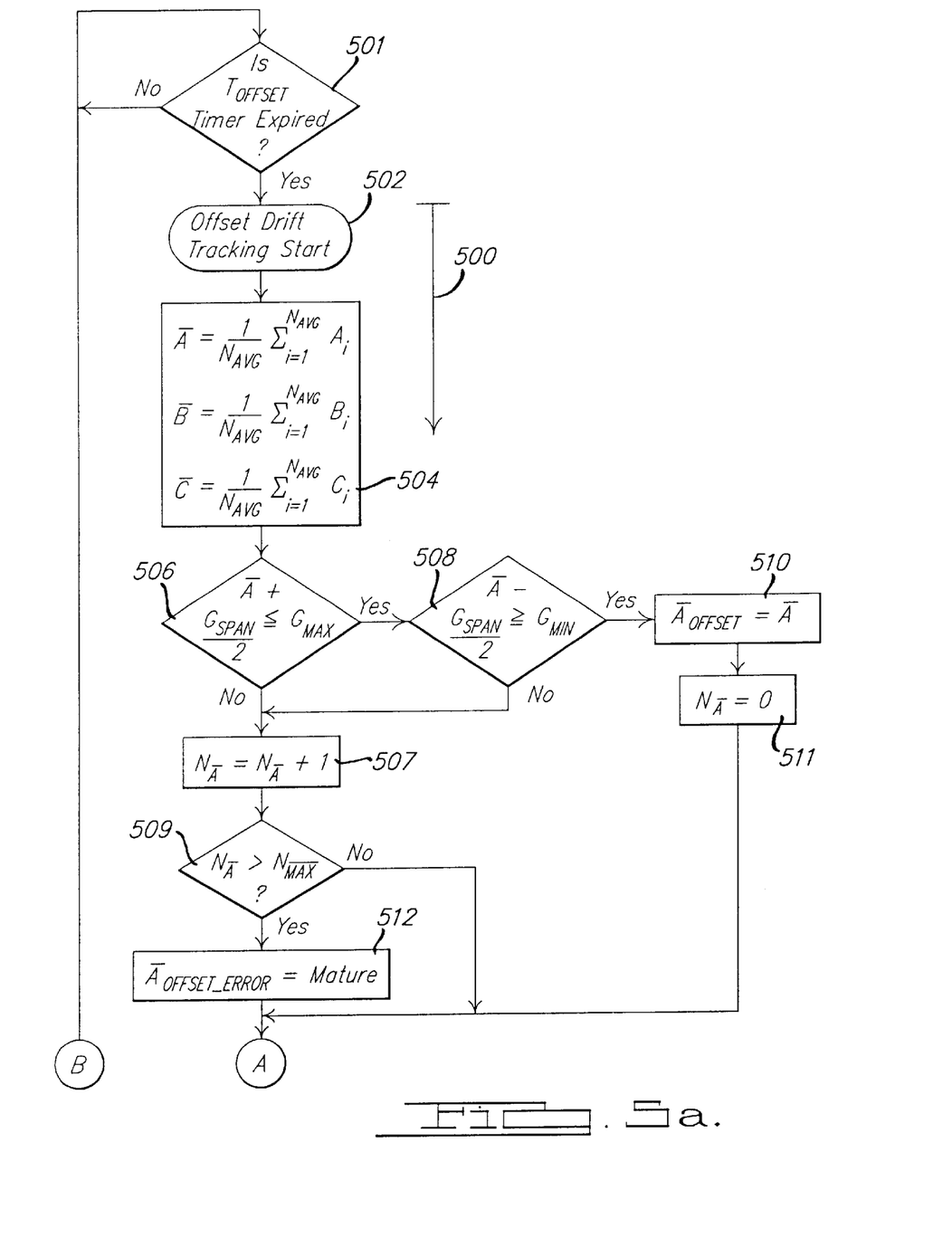
FIGS. 5a and 5b are a flow chart of an associated algorithm for offset drift tracking in accordance with the instant invention.
Figure 5B:
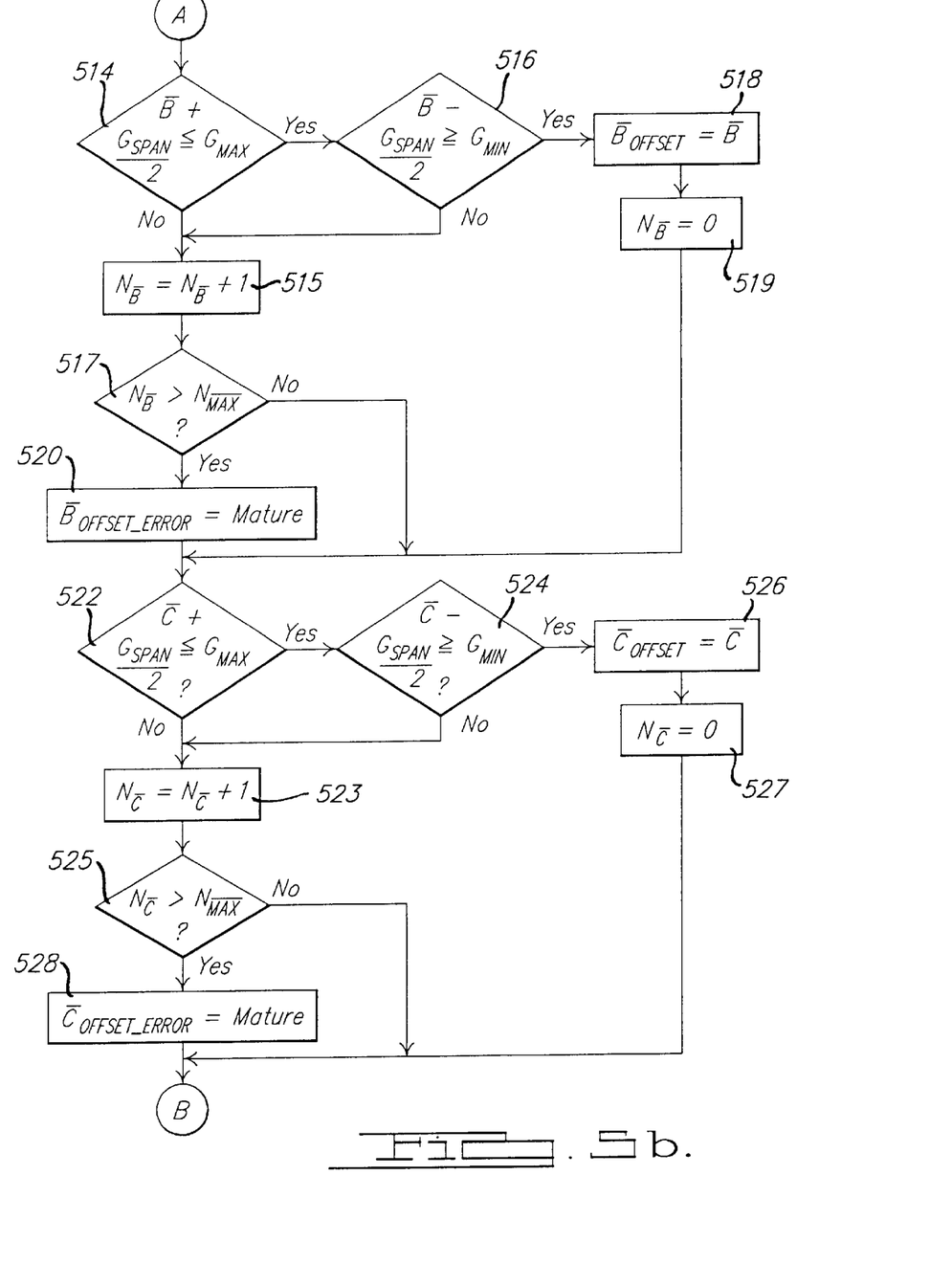
Figure 6A:
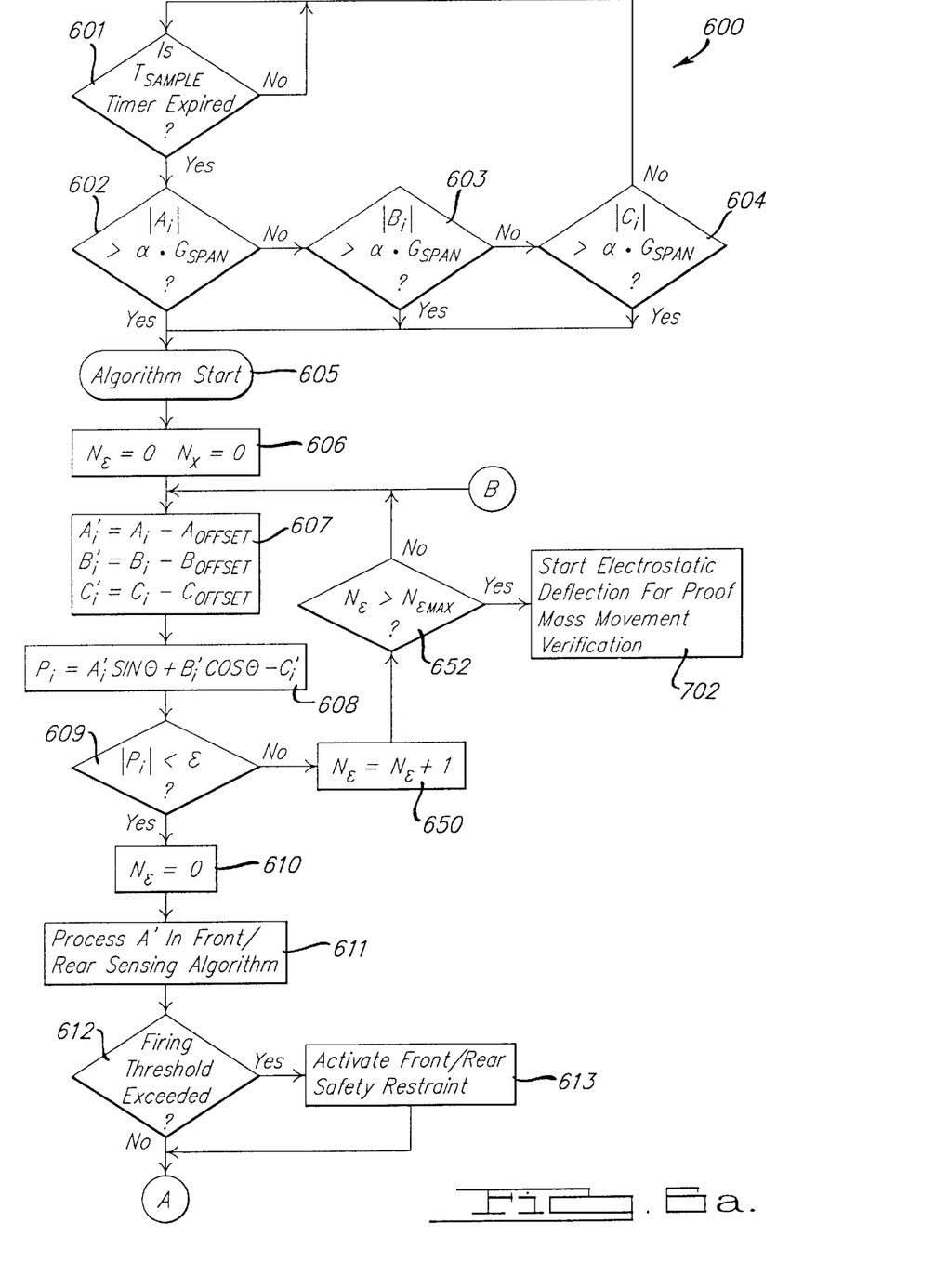
FIGS. 6a and 6b are a flow chart of an associated crash algorithm in accordance with the instant invention.
Figure 6B:
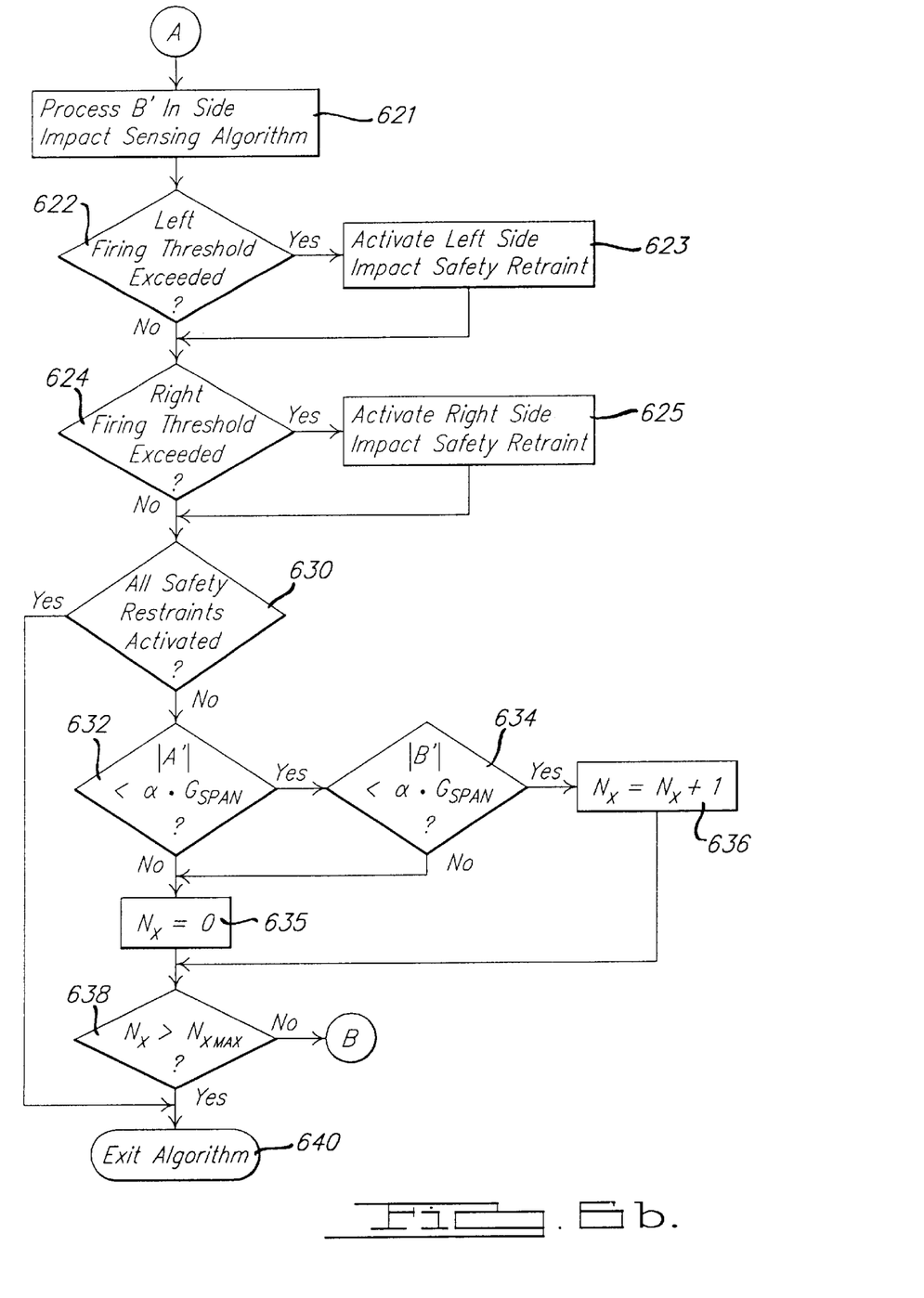
Figure 7:
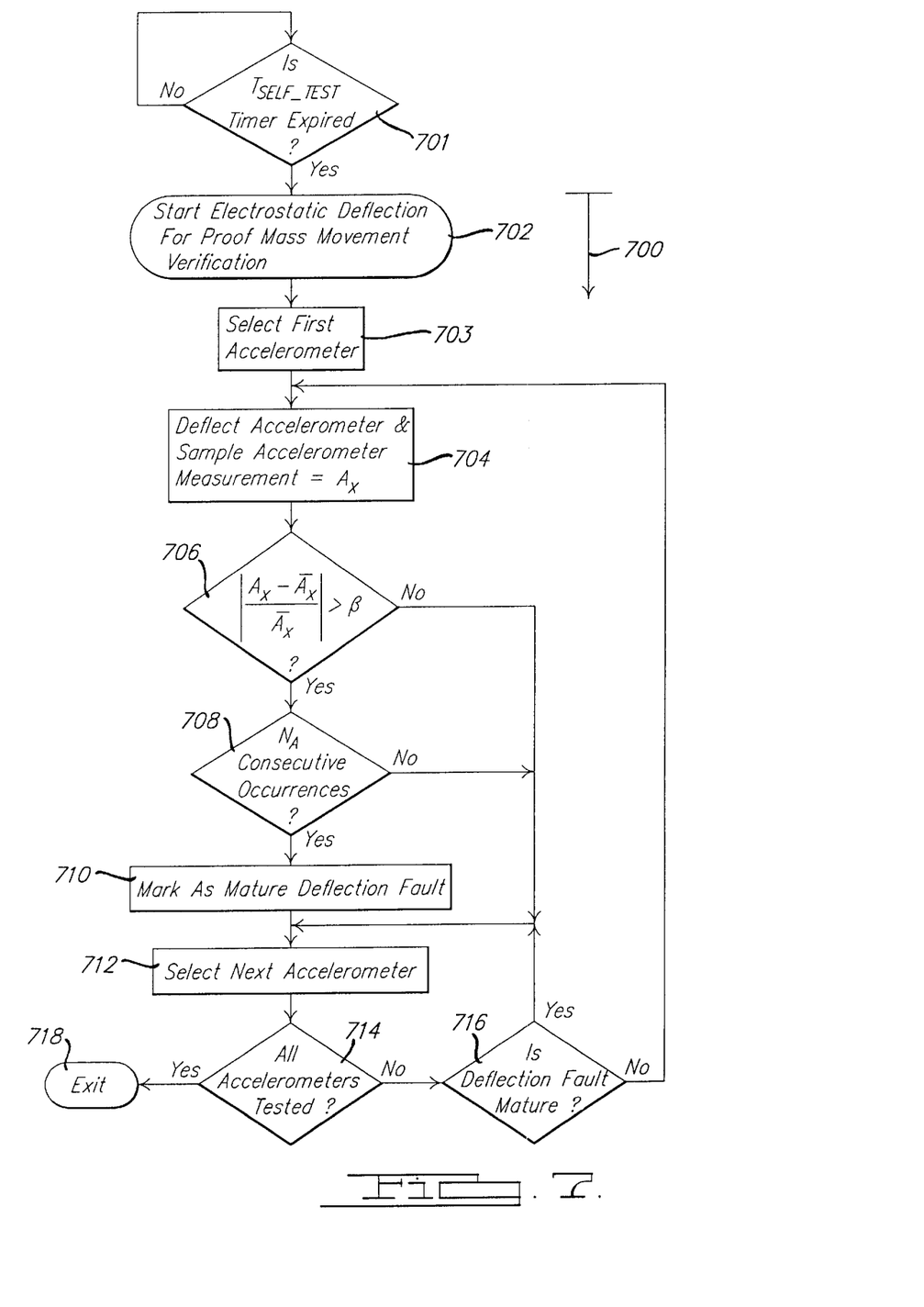
FIG. 7 is a flow chart of an associated electrostatic deflection for proof mass movement verification algorithm in accordance with the instant invention.

FIGS. 5, 6 and 7 illustrate a set of algorithms by which the signals from the accelerometer assembly 26 are processed in the microprocessor/DSP 36 so as to realize the above noted advantages from the instant invention. In overview, FIG. 5 illustrates a method 500 for computing the offset present in the individual accelerometers 10, 12, and 14. FIG. 6 illustrates a method 600 by which the information in the acceleration signals 10.1, 12.1, and 14.1 is used to control the activation of the restraint actuators 801, 802, 803, or 804. FIG. 7 illustrates a method 700 by which proof mass movement by electrostatic deflection is verified for accelerometers 10, 12, and 14.

Referring to FIG. 5, the method 500, beginning with step 502, for computing the offset present in the individual accelerometers 10, 12, and 14 is initiated every $T_{offset}$ seconds by element 501, where $T_{offset}$ varies between 0.5 and 10 seconds depending upon the accelerometer and is typically about one second. A total of $N_{AVG}$ measurements $A_i$, $B_i$, and $C_i$ from respective accelerometers 10, 12, and 14 are sampled and averaged in step 504, whereby $N_{AVG}$ is preferably a power of 2, for example 1024, to simplify the associated division operation within the microprocessor/DSP36. If either of the averaged acceleration values $\overline{A}$, $\overline{B}$, or $\overline{C}$ either exceed the value $G_{max} - G_{Span}/2$ in steps 506, 514, and 522 respectively, or are less than the value $G_{Min}G_{Span}/2$ in steps 508, 516, and 524 respectively, then the respective offset error counters $N_{\overline{A}}$, $N_{\overline{B}}$, and $N_{\overline{C}}$ are incremented by 1 in steps 507, 517, and 523. If any of these respective counters exceed the value $N_{\overline{Max}}$, where $N_{\overline{Max}}$ ranges from 4 to 10 and is typically 4, in steps 509, 519, and 525 respectively, then offset errors $A_{Offset\_Error}$, $B_{Offset\_Error}$, or $C_{Offset\_Error}$ are set as "Mature" in steps 512, 520, and 528, causing a warning signal 50 to be activated by the microprocessor/DSP 36. In the steps described hereinabove, $G_{Span}$ is the accelerometer span of measurement which for a +/−40 G accelerometer would be the equivalent of 80 G's, $G_{Max}$ is a reference maximum acceleration value corresponding to the maximum possible output from the accelerometer circuitry, and $G_{Min}$ is a reference minimum acceleration value corresponding to the minimum possible output from the accelerometer circuitry. For example, for an accelerometer with a 0 to 5 volt output range, the actual signal levels may range between 0.25 to 4.75 Volts. Therefore, $G_{Max}$ would correspond to the "G" equivalent of 4.75 Volts, and $G_{Min}$ would correspond to the "G" equivalent of 0.25 Volts. Alternately, $G_{Max}$ and $G_{Min}$ are the "G" equivalents of the upper an lower rail of the accelerometer output circuitry, respectively. The accelerometer output circuitry could also be pulse width modulation (PWM) based, for which values of $G_{Max}$ and $G_{Min}$ would correspond to associated signal frequencies. If the tests of steps 508, 516, and 524 are satisfied respectively, then the respective offset values $A_{Offset}$, $B_{Offset}$, or $C_{Offset}$ are set to the corresponding averaged values $\overline{A}$, $\overline{B}$, or $\overline{C}$ in steps 510, 518, and 526 respectively, and the offset error counters $N_{\overline{A}}$, $N_{\overline{B}}$, and NC are cleared in steps 511, 519, and 527 respectively. The offset errors detected by method 500 can result for example from either the mounting orientation of the module 30, long duration braking or cornering accelerations, or from accumulated offsets within the accelerometer or the associated electronic circuitry.

Figure 9:
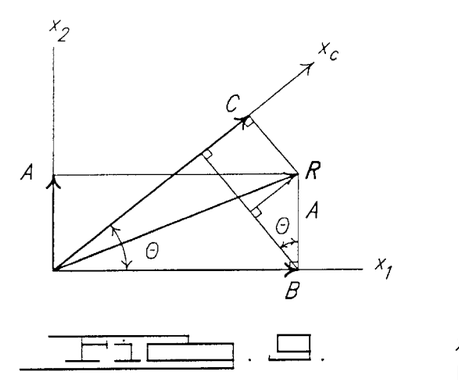
FIG. 9 illustrates the measurement of a arbitrary acceleration vector in accordance with one embodiment of the instant invention.

FIG. 9 illustrates the projection of an arbitrary acceleration vector R along axes $x_1$, $x_2$, and $x_c$ which correspond to axes 18, 20, and 22 respectively of the accelerometer system 26 as illustrated in FIG. 1. The unit vectors directed along axes $x_1$, $x_2$, and $x_C$ are respectively designated as $\mathbf{x}_1$, $\mathbf{x}_2$, and $\mathbf{x}_C$. Acceleration vector R has components (B,A) with respect to the Cartesian basis vectors $\mathbf{x}_1$ and $\mathbf{x}_2$. Therefore, for unit vectors $\mathbf{x}_1$ and $\mathbf{x}_2$, the vector R is given by $R=B \cdot \mathbf{x}_1 + A \cdot \mathbf{x}_2$, whereby component values A and B correspond projections of acceleration vector R along the directions of unit vectors $\mathbf{x}_1$ and $\mathbf{x}_2$ respectively, whereby $A=|R| \cdot \sin(\theta)$ and $B=|R| \cdot \cos(\theta)$. Component values A and B also correspond to measurements of acceleration vector R by accelerometers 10 and 12 respectively. The projection of acceleration vector R along the direction of unit vector $\mathbf{x}_C$ has a magnitude of C, where $$C = B \cdot \cos(\theta) + A \cdot \sin(\theta) \quad (1)$$

as can be seen from the geometry of FIG. 9 or can be found as the projection of R along the rotated $x_1$ axis after rotating the $x_1$, $x_2$ coordinate system by an angle of $\theta$. If equation (1) is satisfied for acceleration measurements A, B, and C made at substantially the same point in time, then the acceleration measurement C can be said to be consistent with acceleration measurements A and B. Preferably, the value of $\theta$ is set to 45 degrees, for which $\cos(\theta) = \sin(\theta) = \sqrt{2}/2$, wherein equation (1) simplifies as:

$$C = \sqrt{2}/2 \cdot (A+B)$$

As illustrated in FIGS. 6a and 6b, in method 600, every $T_{sample}$ seconds in accordance with step 601, where $T_{sample}$ varies between 1 microsecond and 10 milliseconds and is typically about one millisecond, accelerometer signals $A_i$, $B_i$, and $C_i$ are sampled in accordance with steps 602, 603, and 604 respectively. The crash algorithm is started beginning with step 605 if any of the accelerometer signals $A_i$, $B_i$, or $C_i$ exceed a fraction $\alpha$ of the accelerometer span of measurement $G_{Span}$, where a ranges from 0.075 to 0.1 and is typically about 0.1 so that the product of $\alpha \cdot G_{Span}$ is about 3 to 10 G's. In step 606 counters $N_\epsilon$ and $N_x$ are reset to a value of 0. In step 607, the acceleration offset values calculated in method 500 are subtracted from the respective acceleration signals $A_i$, $B_i$ and $C_i$ to give the unbiased acceleration values $A'_i$, $B'_i$, and $C'_i$ respectively. If in step 609 the value of $C'_i$ is consistent with the values of $A'_i$ and $B'_i$ in accordance with equation (1), reformulated as a parity equation in step 608, within an error tolerance $\epsilon$—where $\epsilon$ generally ranges from 0 to 0.3 and is typically about 0.3,—then counter $N_\epsilon$ is reset in step 610. Otherwise, counter $N_\epsilon$ is incremented by 1 in step 650, and if in step 652 the value of counter $N_\epsilon$, which indicates the number of consecutive times that the value $C'_i$ was inconsistent with the values of $A'_i$ and $B'_i$, exceeds the value $N_{\epsilon\_Max}$,—which ranges from 1 to 10 and is typically about 5—then in step 702 the algorithm is exited to start electrostatic deflection for proof mass movement verification in accordance with method 700, otherwise method 600 is repeated beginning with step 607. Given that the value $C'_i$ is consistent with the values of $A'_i$ and $B'_i$, following step 610, the unbiased longitudinal acceleration component $A'_i$ is processed by the front/rear crash sensing algorithm in step 611 and if in step 612 the associated firing threshold is exceeded, the front/rear safety restraint is activated in step 613. Similarly, the unbiased lateral acceleration component $B'_i$ is processed by the side impact crash sensing algorithm in step 621. If in step 622 the associated firing threshold is exceeded for the left side, the left side safety restraint is activated in step 623. If in step 624 the associated firing threshold is exceeded for the right side, the right side safety restraint is activated in step 625. If, at step 630, all safety restraint systems have been activated then in step 640 method 600 is terminated. Otherwise, in steps 632 and 634, if either the magnitude of the unbiased longitudinal acceleration component $A'_i$ or the magnitude of the unbiased lateral acceleration component $B'_i$ exceeds the fraction $\alpha$ of the accelerometer span of measurement $G_{Span}$ then the counter $N_x$ is reset to a value of 0, otherwise the counter $N_x$ is incremented by 1. Counter $N_x$ indicates the number of consecutive times that the magnitudes of both $A'_i$ and $B'_i$ were less than the fraction $\alpha$ of the accelerometer span of measurement $G_{Span}$. If in step 638 the value of counter $N_x$ exceeds the value $N_{x\_Max}$ then in step 640 method 600 is terminated, otherwise method 600 is repeated beginning with step 607. The value of $N_{xMax}$ depends upon the algorithm sampling period $T_{sample}$, but generally has a value which corresponds to a period of 10 to 15 milliseconds.

The crash sensing algorithms incorporated in steps 611 and 621 are readily understood by one having ordinary skill in the art, as for example illustrated in U.S. Pat. Nos. 5,067,745, 5,282,134, 5,337,238, 5,363,302, 5,365,114, 5,394,326, 5,490,066, 5,498,028, 5,508,918, 5,508,920, 5,519,613, 5,541,842, 5,559,699, 5,563,791, 5,606,501 and 5,629,847. The programming for such algorithms is also taught in "A New Decision Making Algorithm for Airbag Control" by Syed Masud Mahmud and Ansaf I. Alrabady, *IEEE Transactions on Vehicular Technology*, Vol 44, No. 3, August 1995, pp. 690–697. Furthermore, the specific crash sensing characteristic and associated algorithm are not considered to be limitations of the instant invention.

Referring to FIG. 7, beginning with step 702, accelerometer proof mass movement is verified using electrostatic deflection, by method 700 which is initiated every $T_{Self\_Test}$ seconds by element 701, where $T_{Self\_Test}$ varies between 0.5 and 10 seconds depending upon the accelerometer and is typically about one second. Beginning with the first accelerometer, selected in step 703, the proof mass of the accelerometer is deflected in step 704 by applying a deflection signal 10.2, 12.2, or 14.2 to the respective accelerometer from output port 38 of the microprocessor/DSP 36, and measuring the associated accelerometer output 10.1, 12.1, or 14.1 respectively at the respective input port 34 of the microprocessor/DSP 36. For example, the proof mass of one type of testable accelerometer is deflected by electrostatic forces between a stationary electrode and an electrode attached to or a part of the proof mass. Other testable accelerometers are tested using different mechanisms, such as for example an inverse piezoelectric effect. The specific self-test mechanism is not limiting to the instant invention. If in step 706 the error of the actual acceleration measurement $A_x$ relative to the expected acceleration measurement $\overline{A_x}$ is greater than an error threshold $\beta$ for $N_A$ consecutive occurrences in step 708, then in step 710 the fault indicator associated with the accelerometer is marked as a mature deflection fault, whereby $\beta$ ranges from 5% to 25% and typically about 5% for 62.5% of full scale deflection, and $N_A$ ranges from 1 to 10 and is typically about 4. Steps 712, 714, and 716 cause steps 704 and 706 to be repeated for each accelerometer for which a mature deflection fault has not been set. After all accelerometers have been tested, method 700 is then terminated in step 718. A warning signal 50 is activated by the microprocessor/DSP 36 whenever any fault indicator indicates a mature deflection fault. Furthermore, data associated with an accelerometer for which either the fault indicator indicates a mature deflection fault, or the deflection fault counter associated with step 708 is nonzero, is not processed when encountered by methods 500, 600, or 700.

Figure 10:
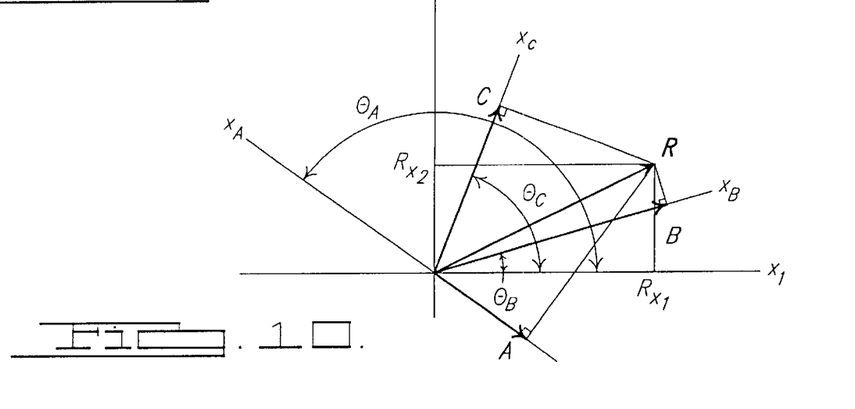
FIG. 10 illustrates the measurement of an arbitrary acceleration vector in accordance with another embodiment of the instant invention.

FIG. 10 illustrates an alternate arrangement of sensing axes $x_A$, $x_B$, and $\theta_C$ at angles $\theta_A$, $\theta_B$, and $\theta_C$ respectively relative to the $x_1$ axis, for accelerometers 10, 12, and 14 respectively, whereby the accelerometers 10, 12, and 14 are not necessarily aligned with the vehicular Cartesian basis vectors $x_1$ and $x_2$. The objective here is to determine acceleration components corresponding to these basis vectors based upon accelerometer measurements. An arbitrary acceleration vector R has components ($R_{x1}$, $R_{x2}$) with respect to basis vectors $x_1$ and $x_2$. The magnitude of the components A, B, and C of acceleration vector R projected along axes $x_A$, $x_B$, and $x_C$, as would be measured by accelerometers 10, 12, and 14 respectively are given by:

$$A = \cos(\theta_A) \cdot R_{x1} + \sin(\theta_A) \cdot R_{x2} \quad (3)$$

$$B = \cos(\theta_B) \cdot R_{x1} + \sin(\theta_B) \cdot R_{x2} \quad (4)$$

$$C = \cos(\theta_C) \cdot R_{x1} + \sin(\theta_C) \cdot R_{x2} \quad (5)$$

Any single pair of equations (3), (4), and (5) may be simultaneously solved to find values for acceleration components ($R_{x1}$, $R_{x2}$), which are needed to control the associated safety restraint systems. Given three acceleration measurements, A, B, and C, three sets of solutions for components ($R_{x1}$, $R_{x2}$) may be obtained by simultaneously solving equation pairs (3)–(4), (3)–(5), and (4)–(5) respectively. These solutions may then be compared to determine the validity of the associated measurement. Alternately, if any one of the acceleration measurements is invalid or unavailable, the pair of equations involving the other two valid and available measurements may be solved, although without a corresponding measure of validity.

Figure 11:
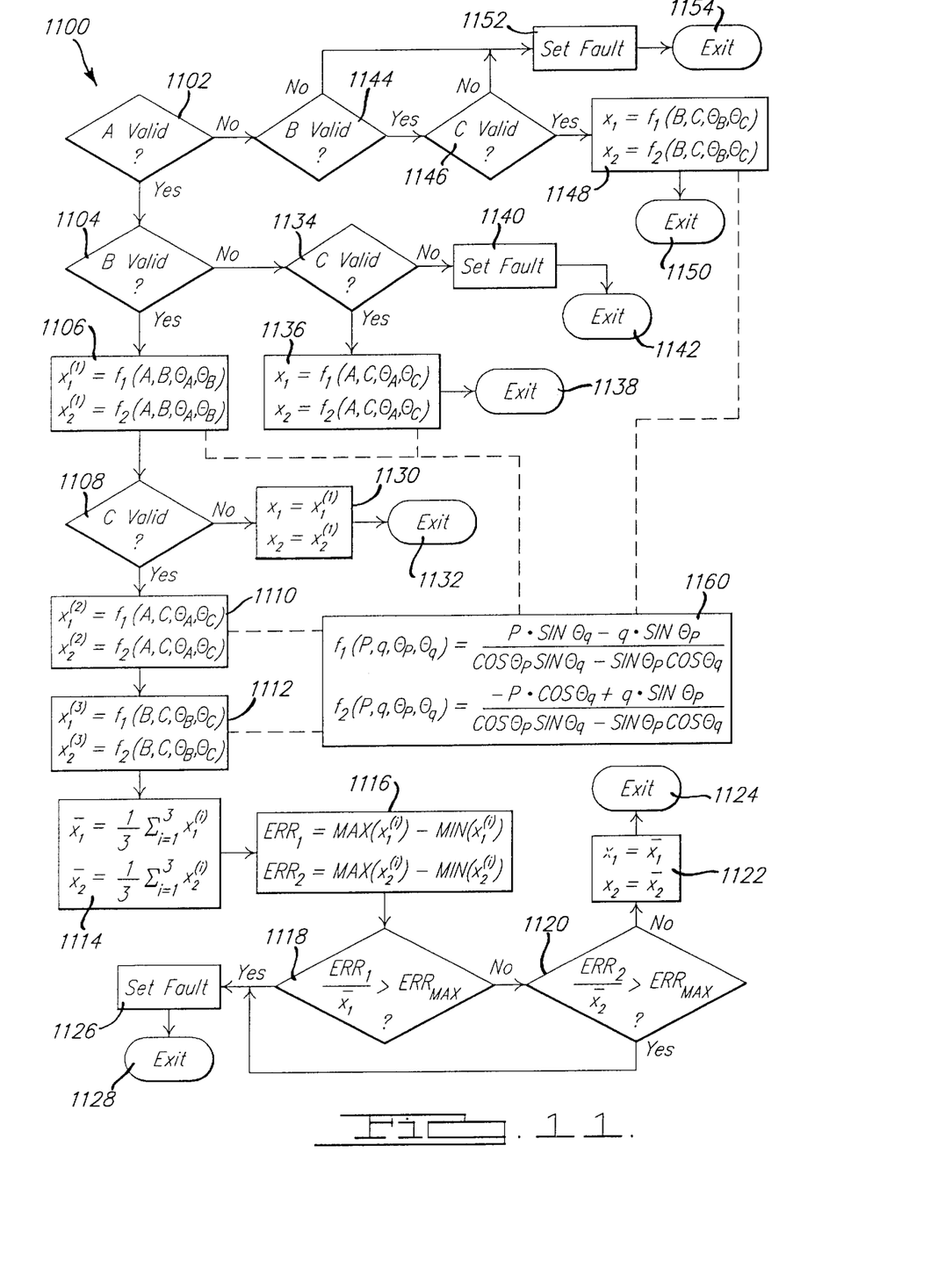
FIG. 11 is a flow chart of an associated acceleration sensing algorithm in accordance with the instant invention.

FIG. 11 illustrates a method 1100 for obtaining a vector acceleration measurement from accelerometers which are arranged in accordance with FIG. 10. If acceleration measurement A is determined to be valid from step 1102, and acceleration measurement B is determined to be valid from step 1104, then equations (3) and (4) are solved simultaneously in step 1106 in accordance with method 1160 to given acceleration basis components $\chi_1^{(1)}$ and $\chi_2^{(1)}$. Then, if acceleration measurement C is determined to be valid from step 1108, equations (3) and (5) are solved simultaneously in step 1110 in accordance with method 1160 to given acceleration basis components $\chi_x^{(2)}$ and $\chi_2^{(2)}$, and equations (4) and (5) are solved simultaneously in step 1112 in accordance with method 1160 to given acceleration basis components $\chi_1^{(3)}$ and $\chi_2^{(3)}$. The average values of basis components $\overline{\chi_1}$ and $\overline{\chi_2}$ are then calculated from basis components $\chi_1^{(1)}$, $\chi_1^{(2)}$, $\chi_1^{(3)}$ and $\chi_2^{(1)}$, $\chi_2^{(2)}$, $\chi_2^{(3)}$ respectively in step 1114. The maximum difference between basis component values is calculated in step 1116 for each component, and if steps 1118 and 1120, if either of these calculated differences exceeds a threshold value, a fault condition is set in step 1126 and the method is terminated in step 1128. Otherwise, in step 1122 the returned value of the basis components $\chi_1$ and $\chi_2$ is set to the respective average values of basis components $\overline{\chi_1}$ and $\overline{\chi_2}$ and the method is terminated in step 1124. If in step 1102 acceleration measurement A is determined to be invalid then if in steps 1144 and 1146 respectively either acceleration measurements B or C are determined to be invalid then a fault condition is set in step 1152 and the method is terminated in step 1154, otherwise equations (4) and (5) are solved simultaneously in step 1148 in accordance with method 1160 to give acceleration basis components $\chi_1$ and $\chi_2$ and the method is terminated in step 1150. If in step 1104 acceleration measurement B is determined to be invalid then if in step 1134 acceleration measurement C is determined to be invalid then a fault condition is set in step 1140 and the method is terminated in step 1142, otherwise equations (3) and (5) are solved simultaneously in step 1136 in accordance with method 1160 to given acceleration basis components $\chi_1$ and $\chi_2$ and the method is terminated in step 1138. The method 1100 is thereafter repeated for each successive point in time.

The instant invention must be highly reliable if incorporated into a vehicle safety system. The reliability of the instant invention is governed by the likelihood of various associated failure modes and whether or not these failure modes are detectable.

In one failure mode, failure of the analog-to-digital converter servicing all of the accelerometers is detectable by repeatedly performing a linearity test thereon in real time during vehicle operation. In the event that the analog-to-digital converter reference fails, the integrated circuit pin associated with the reference could short to vehicle ground through an impedance. This failure mode is easily detectable by performing a half scale comparison against a fixed divider repeatedly in real time during vehicle operation.

In another failure mode, failure of any or all of the accelerometers 10, 12 or 14 is detectable by performing a mechanical/electrical self test on each accelerometer individually each time the vehicle is started.

In yet another failure mode, if any or all of the outputs from the accelerometers 10, 12 or 14 fails, then an associated integrated circuit pin short to vehicle ground or short to module power or battery through an impedance is detectable by performing an output drift measurement on each accelerometer 10, 12 or 14 in real time during vehicle operation and comparing the drift values to specified limits.

Furthermore, the omnidirectional nature of this disclosed system solves the inadvertent firing problems of prior art systems—comprising the combination of a single accelerometer with an electromechanical sensor—caused by a shorting of the accelerometer output to module power while the electromechanical sensor is simultaneously closed by rough road conditions.

In yet another failure mode, a false accelerometer output caused by electromagnetic fields is detectable due to the omnidirectional sensor redundancy of the instant invention. The probability is extremely small that an EMI field could cause three apparently consistent accelerometer signals which would not otherwise be detected as faulty.

One of ordinary skill in the art will appreciate that the functions of the microprocessor/DSP 36 system which processes the accelerometer signals in accordance with the methods of FIGS. 5–7 and FIG. 11 can be performed by a variety of means, including but not limited to digital circuitry, analog circuitry, relay logic, a digital computer, a microprocessor, a digital signal processor, or a combination in whole or in part thereof.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. An acceleration sensor, comprising:
   a. a plurality of at least three substantially co-planar accelerometers with axes both skewed relative to one another and intersecting a region near a point;
   b. a means for determining at least one acceleration basis value from at least one of said plurality of acceleration measurements; and
   c. a means for outputting at least one of said acceleration basis values.

2. The acceleration sensor as recited in claim 1, further comprising:
   d. a means for estimating the acceleration for one of said accelerometers from acceleration measurements of the other of said accelerometers;
   e. a means for comparing said estimated acceleration for said one of said accelerometers with the measurement from said one of said accelerometers; and
   f. a memory which stores an error threshold value, whereby said means for outputting at least one of said acceleration basis values is inhibited if said estimated acceleration for said one of said accelerometers differs from the measurement from said one of said accelerometers by more than said error threshold.

3. The acceleration sensor as recited in claim 1, further comprising:
   d. a means for determining from said acceleration measurements from each unique pair of accelerometers a plurality of associated components of an acceleration basis vector; and
   e. a memory which stores an error threshold value, whereby said means for outputting at least one of said acceleration basis values is inhibited if said plurality of associated components of said acceleration basis vector differ from one another by more than said error threshold.

4. The acceleration sensor as recited in claim 1, further comprising a means for detecting if any of said accelerometers is faulty, whereby if one of said accelerometers is faulty then said means for determining at least one acceleration basis value relies only upon one or more acceleration measurements from the other of said accelerometers which are not faulty.

5. An apparatus for controlling the activation of a safety restraint system, comprising:
   a. a plurality of at least three substantially co-planar accelerometers with axes both skewed relative to one another and intersecting a region near a point;
   b. a means for determining at least one acceleration basis value from at least one of said plurality of acceleration measurements;
   c. a means for selecting time series elements of at least one of said acceleration basis values; and
   d. a means for determining if the safety restraint system should be activated based upon said time series.

6. The apparatus for controlling the activation of a safety restraint system as recited in claim 5, further comprising a memory which stores an error threshold, whereby acceleration basis values for which said estimated acceleration for said one of said accelerometers differs from the measurement from said one of said accelerometers by more than said error threshold are not included in said time series.

7. The apparatus for controlling the activation of a safety restraint system as recited in claim 5, further comprising a memory which stores an error threshold, whereby acceleration basis values for which said plurality of associated components of said acceleration basis vector differ from one another by more than said error threshold are not included in said time series.

8. The apparatus for controlling the activation of a safety restraint system as recited in claim 5, further comprising a means for detecting if any of said accelerometers is faulty, whereby if one of said accelerometers is faulty then said means for determining at least one acceleration basis value relies only upon one or more acceleration measurements from the other of said accelerometers which are not faulty.

9. A method of sensing acceleration, comprising:
   a. making measurements of acceleration from a plurality of at least three substantially co-planar accelerometers with axes both skewed relative to one another and intersecting a region near a point;
   b. determining at least one acceleration basis value using said measurements of acceleration from at least one of said plurality of accelerometers; and
   c. outputting at least one of said acceleration basis values.

10. The method of sensing acceleration as recited in claim 9, further comprising:
    d. estimating the acceleration for one of said accelerometers from acceleration measurements of the other of said accelerometers; and
    e. comparing said estimated acceleration for said one of said accelerometers with the measurement from said one of said accelerometers, whereby said outputting at least one of said acceleration basis values is inhibited if said estimated acceleration for said one of said accelerometers differs from the measurement from said one of said accelerometers by more than an error threshold.

11. The method of sensing acceleration as recited in claim 9, further comprising the determination from said acceleration measurements from each unique pair of accelerometers a plurality of associated components of an acceleration basis vector, whereby said outputting at least one of said acceleration basis values is inhibited if said plurality of associated components of said acceleration basis vector differ from one another by more than an error threshold.

12. The method of sensing acceleration as recited in claim 9, further comprising the detection of whether any of said accelerometers is faulty, whereby said determining of said acceleration basis values relies only upon one or more acceleration measurements from the other of said accelerometers which are not faulty.

13. A method of controlling the activation of a safety restraint system, comprising:
   a. making measurements of acceleration from a plurality of at least three substantially co-planar accelerometers with axes both skewed relative to one another and intersecting a region near a point;
   b. determining at least one acceleration basis value using said measurements of acceleration from at least one of said plurality of accelerometers; and
   c. determining if the safety restraint system should be activated based upon the time series of said basis values.

14. The method of controlling the activation of a safety restraint system as recited in claim 13, whereby acceleration basis values for which an estimated acceleration for said one of said accelerometers differs from said measurement from said one of said accelerometers by more than an error threshold are not included in said time series.

15. The method of controlling the activation of a safety restraint system as recited in claim 13, whereby acceleration basis values for which a plurality of associated components of said acceleration basis vector differ from one another by more than an error threshold are not included in said time series.

16. The method of controlling the activation of a safety restraint system as recited in claim 13, whereby if one of said accelerometers is faulty then said means for determining at least one acceleration basis value relies only upon one or more acceleration measurements from the other of said accelerometers which are not faulty.

17. The method of controlling the activation of a safety restraint system as recited in claim 13 further comprising the removal of offset from said acceleration measurements.

18. The method of controlling the activation of a safety restraint system as recited in claim 14 further comprising the removal of offset from said acceleration measurements.

19. The method of controlling the activation of a safety restraint system as recited in claim 15 further comprising the removal of offset from said acceleration measurements.

20. The method of controlling the activation of a safety restraint system as recited in claim 16 further comprising the removal of offset from said acceleration measurements.

* * * * *